(12) United States Patent
Sugawara et al.

(10) Patent No.: US 7,190,423 B2
(45) Date of Patent: Mar. 13, 2007

(54) LIQUID CRYSTAL MONITOR

(75) Inventors: Hideaki Sugawara, Kanagawa (JP); Hiroshi Ishida, Kanagawa (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/463,134

(22) Filed: Jun. 17, 2003

(65) Prior Publication Data

US 2003/0234895 A1 Dec. 25, 2003

(30) Foreign Application Priority Data

Jun. 24, 2002 (JP) ............................. 2002/182526

(51) Int. Cl.
*G02F 1/1333* (2006.01)
(52) U.S. Cl. .......................................... 349/58; 349/64
(58) Field of Classification Search ............ 349/58–60, 349/12, 16
See application file for complete search history.

(56) References Cited

U.S. PATENT DOCUMENTS 6,559,908 B2 * 5/2003 Hiratsuka et al. ............. 349/58
2002/0126236 A1 * 9/2002 Hiratsuka et al. ............. 349/58
2004/0239828 A1 * 12/2004 Cho ............................ 349/58

FOREIGN PATENT DOCUMENTS

| CN | 1272634 A | 11/2000 |
| JP | 62-197173 | 12/1987 |
| JP | 64-515 | 1/1989 |
| JP | 9-68703 | 3/1997 |
| JP | 2001-272659 | 10/2001 |
| JP | 2002268566 | * 9/2002 |

* cited by examiner

*Primary Examiner*—Dung T. Nguyen
(74) *Attorney, Agent, or Firm*—Muirhead & Saturnelli, LLC

(57) ABSTRACT

A liquid crystal monitor incorporating therein a liquid crystal module having a direct backlight is configured to have receiving portions in a reflector 8 of the direct backlight that constitutes a liquid crystal module 13, in order to attach together the liquid crystal module 13 and a liquid crystal monitor member 12. The receiving portions are constituted by reflector extensions 111 that are formed by extending a bottom face of the reflector 8 toward a space between an inclined face of the reflector and an upper frame 2 of the liquid crystal module 13. Then, the liquid crystal monitor member 12 is fixed to the reflector extensions 111 by screws 407. Thus, the use of a space near the inclined face of the reflector allows a liquid crystal monitor to be thinned and reduced in its size and the width of monitor frame.

11 Claims, 16 Drawing Sheets

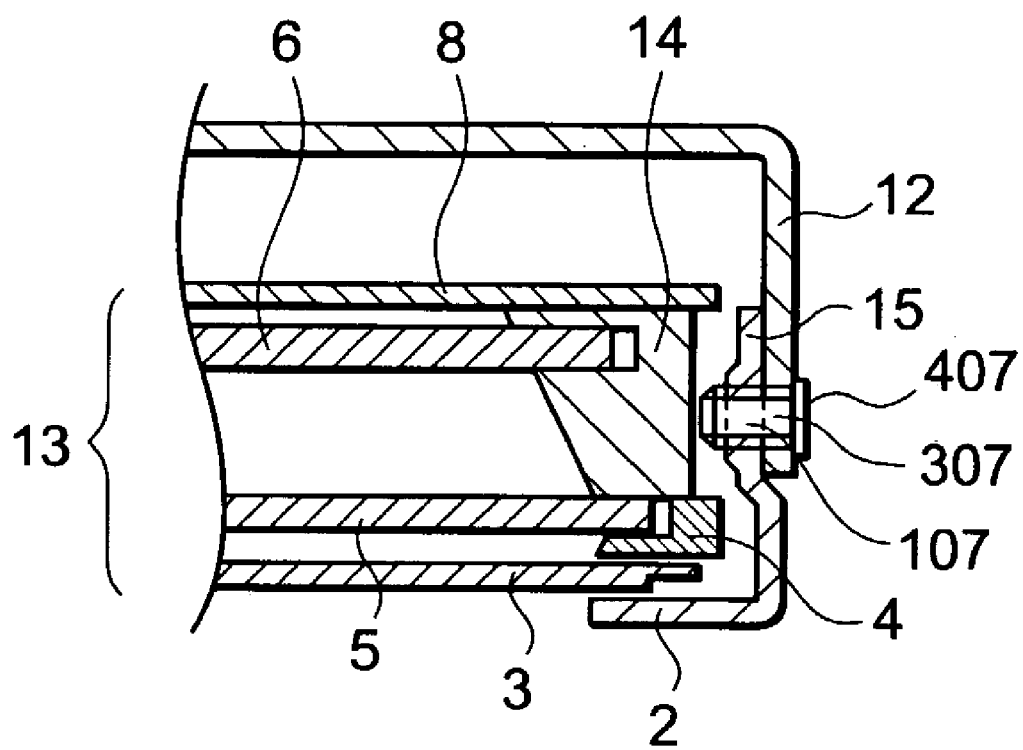

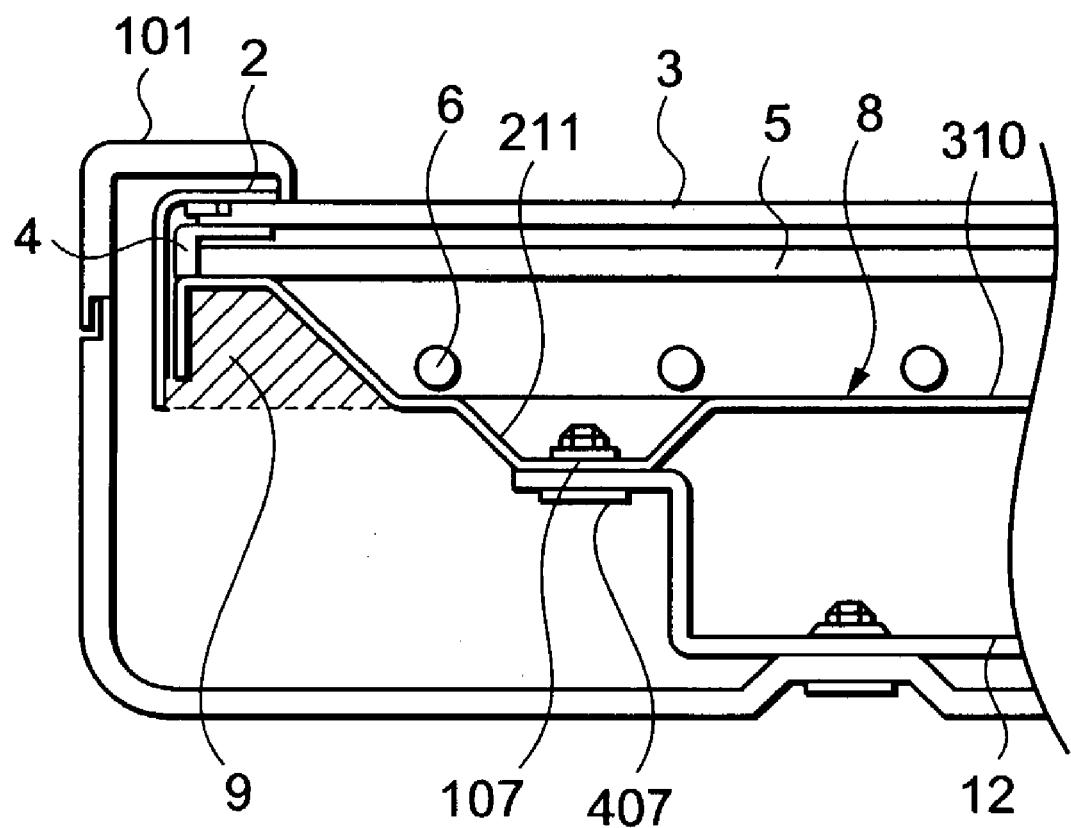

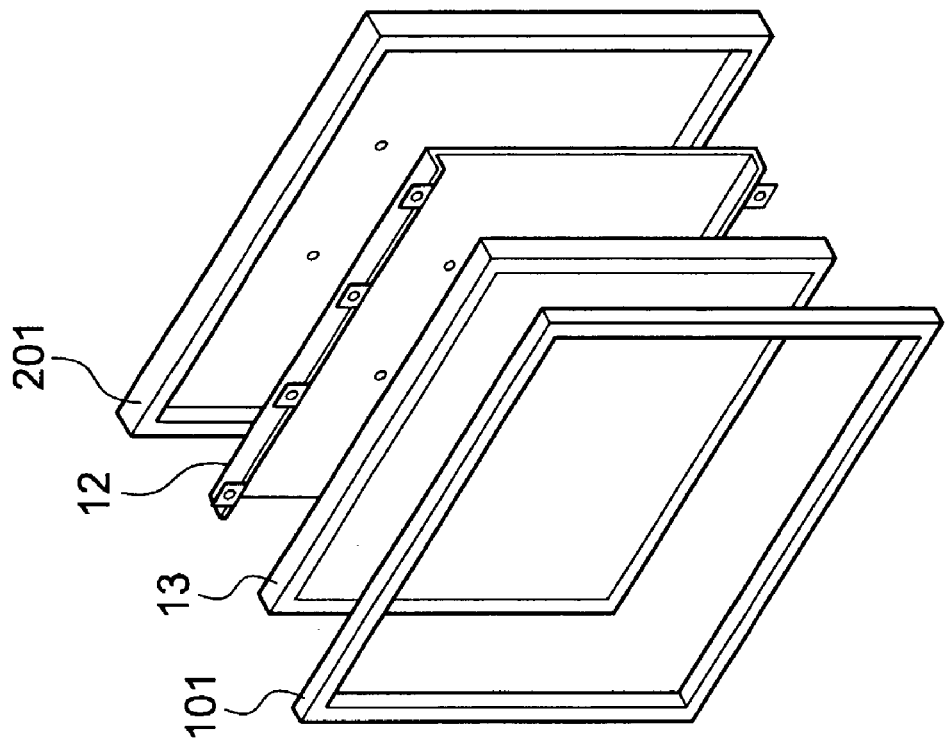
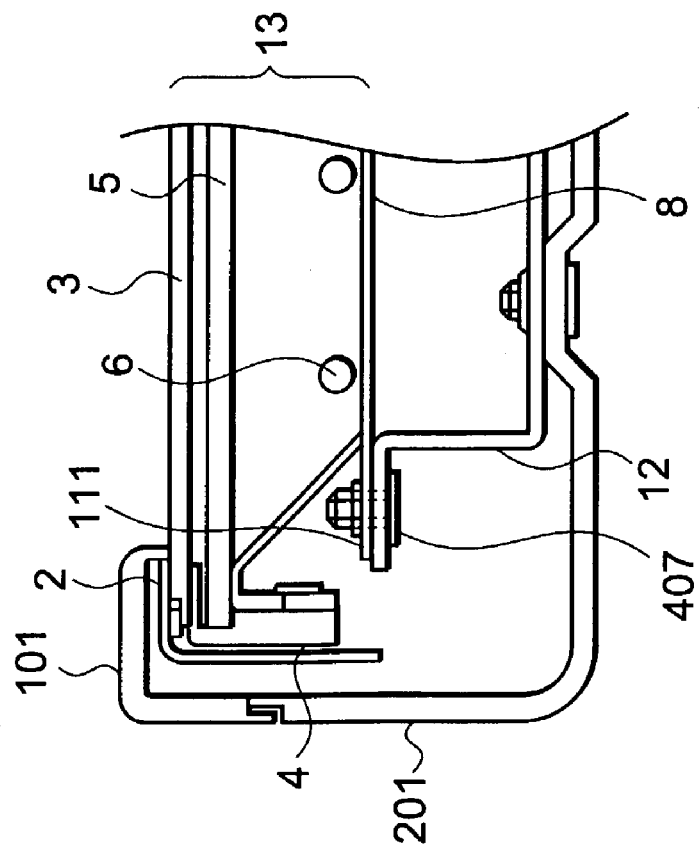

FIG. 9
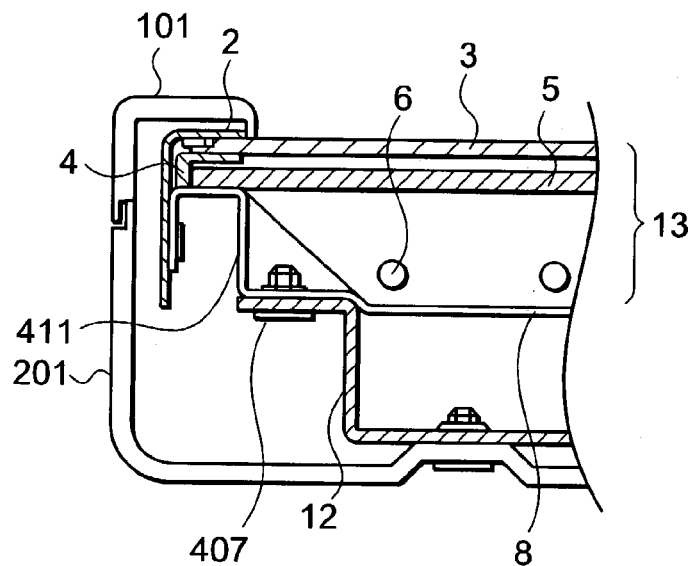
FIG. 10A    FIG. 10B
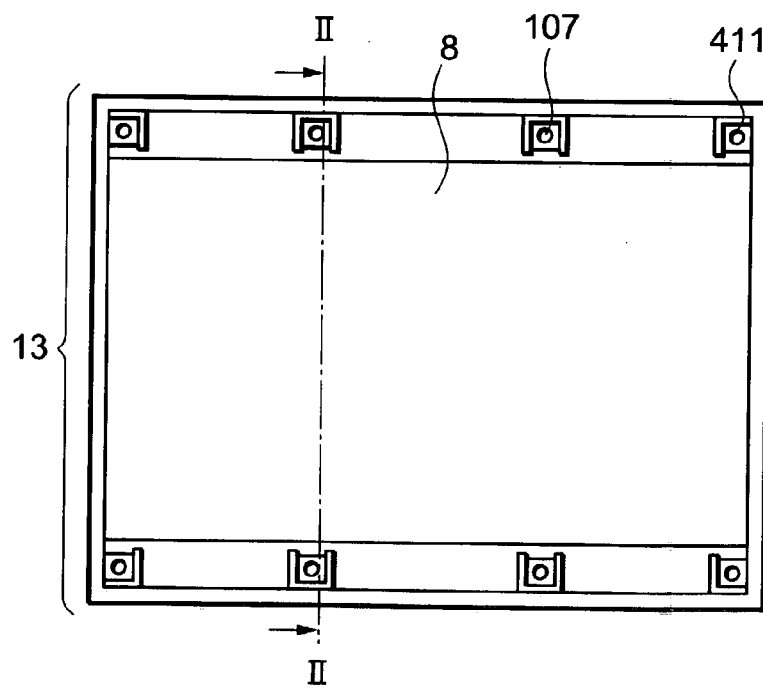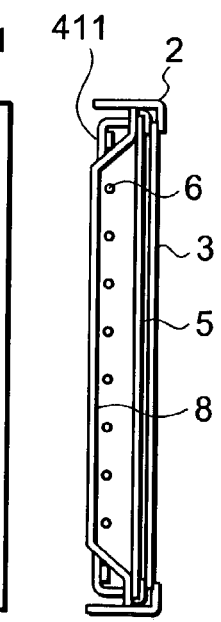

LIQUID CRYSTAL MONITOR

BACKGROUND OF THE INVENTION

1. Field of the Invention

The present invention relates to a liquid crystal monitor incorporating therein a liquid crystal module that includes a direct backlight, and in particular to a liquid crystal module configuration and an attachment structure for attaching together a liquid crystal module and a liquid crystal monitor member.

2. Description of the Related Art

A liquid crystal display device has been employed in monitors incorporated such as in a thin television receiver or a personal computer. The liquid crystal monitor includes a liquid crystal module incorporating therein a liquid crystal panel and a backlight, and a monitor compartment housing the liquid crystal module. The liquid crystal module is housed within the monitor compartment by attaching the liquid crystal module to a liquid crystal monitor member (hereinafter, referred to simply as a monitor member) and then covering the two combined components with a compartment frame. Two types of backlights are primarily employed as a backlight. That is, one is an edge-lit backlight configured to have a light source such as a fluorescent tube disposed on the side of the backlight and allow light from the light source to be guided to the liquid crystal panel by a light guide plate. The other is a direct backlight configured to have a light source disposed facing the liquid crystal panel. A liquid crystal panel assembled with a direct backlight has a comparatively high brightness compared with a liquid crystal panel assembled with an edge-lit backlight and therefore, the direct backlight is employed in a liquid crystal monitor of a high-resolution television receiver and the like.

Conventionally, there are two types of attachment structures for attaching together a liquid crystal module and a monitor member. That is, one is employed to directly fix a liquid crystal module and a monitor member to each other using a screw through a screw hole provided in the side face of the liquid crystal module (hereinafter, referred to as a side attachment method). The other is employed to directly fix a liquid crystal module and a monitor member to each other using a screw through a screw hole provided in the rear face of the liquid crystal module (hereinafter, referred to as a rear attachment method).

The conventional side attachment method is performed as follows. That is, as indicated in the partial cross sectional view shown in FIG. 1, a liquid crystal panel 3, an intermediate frame 4 mounted to the panel 3, a diffuser 5, a fluorescent tube 6 and a reflector 8 are fixed to a support 14, and an upper frame 2 is mounted to the assembly formed by the aforementioned components, thereby forming a liquid crystal module 13. A monitor member 12 is fixed to the side face of the liquid crystal module 13 by screws and a compartment frame is made to cover the entire assembly. That is, screw holes 107 are provided in left/right sides or upper/lower sides of the upper frame protrusion 15 and the monitor member 12 is fixed to the upper frame 2 through the protrusion 15 by screws 407 to cover the side faces of the liquid crystal module.

Furthermore, the conventional rear attachment method is performed as follows. That is, as indicated in the partial cross sectional view shown in FIG. 2, a liquid crystal panel 3, an intermediate frame 4 mounted to the panel 3, a diffuser 5, a fluorescent tube 6 and a reflector 8 are assembled to form a liquid crystal module. A protrusion 211 protruding toward the outside of the liquid crystal module while avoiding contact between the optical member of a backlight and the distal end of an attachment screw is formed in a lower reflecting face 310 of the reflector 8 of the liquid crystal module, and a screw hole 107 is provided in the protrusion 211 to fix a monitor member 12 with a screw 407 through the screw hole 107 to the reflector 8, and then, a compartment frame 101 is made to cover the outer periphery of the assembly formed by the aforementioned components.

However, in the above-described conventional side attachment method for attachment between a liquid crystal module and a monitor member, the attachment screw 407 needs to have its distal end positioned so as to avoid contact with the optical members of the backlight that is incorporated within the liquid crystal module and accordingly, the compartment frame 101 constituting the circumference of liquid crystal monitor is forced to have a circumference that avoids contact with the side face of the monitor member and the protrusion of the attachment screw. This causes the frame of the liquid crystal monitor to be expanded, unfavorably increasing the size of the circumference of the liquid crystal monitor.

Furthermore, in the conventional side attachment method, if the attachment screw is attached at a location that is displaced from the position shown in FIG. 1 in a direction of the thickness of the liquid crystal module to avoid contact between the optical members of the backlight and the distal end of the attachment screw, the thickness of the liquid crystal module increases and accordingly, the compartment frame covering the liquid crystal module increases its thickness, unfavorably increasing the volume of liquid crystal monitor.

Additionally, the liquid crystal monitor assembled using the above-described rear attachment method is constructed such that a protrusion protruding toward the outside of the liquid crystal module is formed in the reflecting face of the reflector to avoid the optical members of the backlight and the distal end of the attachment screw, and a location at which the attachment screw is attached to the monitor member is secured in the protrusion. This unfavorably increases the thickness of the liquid crystal monitor, as well as the volume thereof.

It should be appreciated that other than the aforementioned attachment methods, i. e., the side attachment method and the rear attachment method, an attachment method is available in which a receiving portion of a liquid crystal module is adapted to attach to an attachment portion of a monitor member and both the receiving portion and the attachment portion are positioned outside the circumference of the liquid crystal module. According to the attachment method, the receiving portion and the attachment portion adapted to attach together a liquid crystal module and a monitor member are positioned to avoid contact with backlight members and the liquid crystal module is fixed to the monitor member through the receiving portion by a screw. Accordingly, a compartment frame needs to have a circumference that avoids contact with individual sets of receiving portion and attachment portion and the frame of liquid crystal monitor becomes wider, unfavorably increasing the size of liquid crystal monitor, as well as the volume thereof.

SUMMARY OF THE INVENTION

In consideration of the aforementioned problems found in the conventional techniques, the present invention has been conceived and is directed to a liquid crystal monitor including a novel liquid crystal module assembly that allows the liquid crystal monitor to be thinned and reduced in its size and the width of monitor frame and further an attachment structure for attaching together a liquid crystal module and a liquid crystal monitor member.

A liquid crystal monitor of the invention includes: a liquid crystal module that includes a direct backlight containing a reflector, a liquid crystal panel, and an upper frame holding the direct backlight and the liquid crystal panel; a liquid crystal monitor member; and a compartment frame covering an assembly formed by attaching together the liquid crystal module and the liquid crystal monitor member through a receiving portion of the liquid crystal module and an attachment portion of the liquid crystal monitor member, in which the liquid crystal monitor is further constructed such that the receiving portion of the liquid crystal module is provided so as not to protrude from a rectangular circumference defined by primary faces of the direct backlight, the liquid crystal panel and the upper frame.

The liquid crystal monitor of the invention is configured to have the receiving portion provided in the liquid crystal module and formed in either the reflector or the upper frame.

When the liquid crystal monitor of the invention is configured to have the receiving portion provided in the liquid crystal module and formed in the reflector, the liquid crystal monitor of the invention is configured as follows.

That is, the receiving portion is: disposed in a space between an inclined face of the reflector and the upper frame of the liquid crystal module; or formed by extending a part of the reflector in a direction parallel to a primary face of the reflector; or formed by extending a part of the reflector from a primary face of the reflector while bending the part of the reflector; or formed by protruding a part of the reflector from a primary face of the reflector; or formed of a component joined to the reflector.

The above-described liquid crystal monitor of the invention is further constructed such that the receiving portion of the liquid crystal module and the attachment portion of the liquid crystal monitor member each have a screw hole formed therein and the liquid crystal module and the liquid crystal monitor member are joined together via the screw holes by a screw.

When the liquid crystal monitor of the invention is configured to have the receiving portion provided in the liquid crystal module and formed in the upper frame, the liquid crystal monitor of the invention is constructed such that the liquid crystal module is configured to have the receiving portion formed in a side face of the upper frame and the receiving portion formed in the side face of the upper frame is disposed in a space between an inclined face of the direct backlight and the upper frame, and further, has a screw hole formed therein.

The above-described liquid crystal monitor of the invention is further constructed such that the liquid crystal module is configured to have a screw hole formed therein and the liquid crystal module and the liquid crystal monitor member are joined together via the screw holes by a screw.

BRIEF DESCRIPTION OF THE DRAWINGS

FIG. 1 is a partial cross sectional view of a liquid crystal monitor assembled using the conventional side attachment method;

FIG. 2 is a partial cross sectional view of a liquid crystal monitor assembled using the conventional rear attachment method;

FIG. 3A is a partial sectional view of a liquid crystal monitor according to a first embodiment of the invention;

FIG. 3B is an exploded perspective view of the liquid crystal monitor of the first embodiment of the invention;

FIG. 9 is a partial sectional view of a liquid crystal monitor according to a third embodiment of the invention;

FIG. 10A is a rear side view of the liquid crystal module shown in FIG. 9;

FIG. 10B is a cross sectional view taken along line II—II of FIG. 10A;

DETAILED DESCRIPTION OF THE PREFERRED EMBODIMENTS

Figure 4:
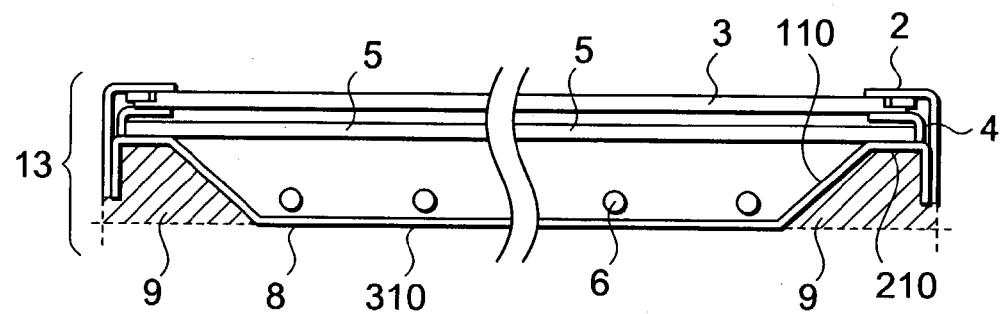
FIG. 4 is a cross sectional view of the liquid crystal module employed in the first embodiment of the invention.

Embodiments of the present invention will be explained below with reference to the accompanying drawings. FIGS. 3A, 3B are a partial sectional view of a liquid crystal monitor and an exploded perspective view thereof according to a first embodiment of the invention. As shown in FIG. 3A, the liquid crystal monitor includes a liquid crystal panel 3, an intermediate frame 4, a diffuser 5, a direct back light consisting of fluorescent tubes 6 and a reflector 8 are assembled together, and an upper frame 2 is mounted to the assembly formed by the aforementioned components to thereby form a liquid crystal module 13. A monitor member 12 is provided to keep in place the liquid crystal module 13 with primary members that constitute a liquid crystal monitor compartment, in order to support the entire liquid crystal monitor. The liquid crystal module 13 and the monitor member 12 are fixed to each other by screws 407 through screw holes 107 provided in reflector extensions 111 of the liquid crystal module 13 and the outer periphery of the assembly formed by the aforementioned components is covered by a panel side compartment frame 101 and a rear side compartment frame 201.

FIG. 4 is a cross sectional view of the liquid crystal module 13. The liquid crystal module 13 is provided such that the liquid crystal panel 3 and the diffuser 5 are assembled together via the intermediate frame 4 and a direct backlight is attached to the side of the diffuser 5, and the upper frame 2 is mounted to the outer periphery of the assembly formed by the aforementioned components. Furthermore, the direct backlight includes a plurality of fluorescent tubes 6 and the reflector 8. The reflector 8 is provided to have a shape formed by a reflector slope 110, an upper reflecting face 210 and a lower reflecting face 310, so that lights emitted from the fluorescent tubes 6 located on both sides of the array of the plurality of fluorescent tubes 6 are effectively focused onto the liquid crystal panel 3 and the amount of lights exiting a screen of the monitor is made uniform. In this case, the upper reflecting face 210 is fixed to the intermediate frame 4. Furthermore, the reflector slope 110, the upper reflecting face 210, the extension of the lower reflecting face 310, and the side face of the upper frame 2 or the circumference of the liquid crystal module 13 confine an area as a space 9 enclosed by a dashed line and denoted by slant lines.

Figures 5A, 5B:
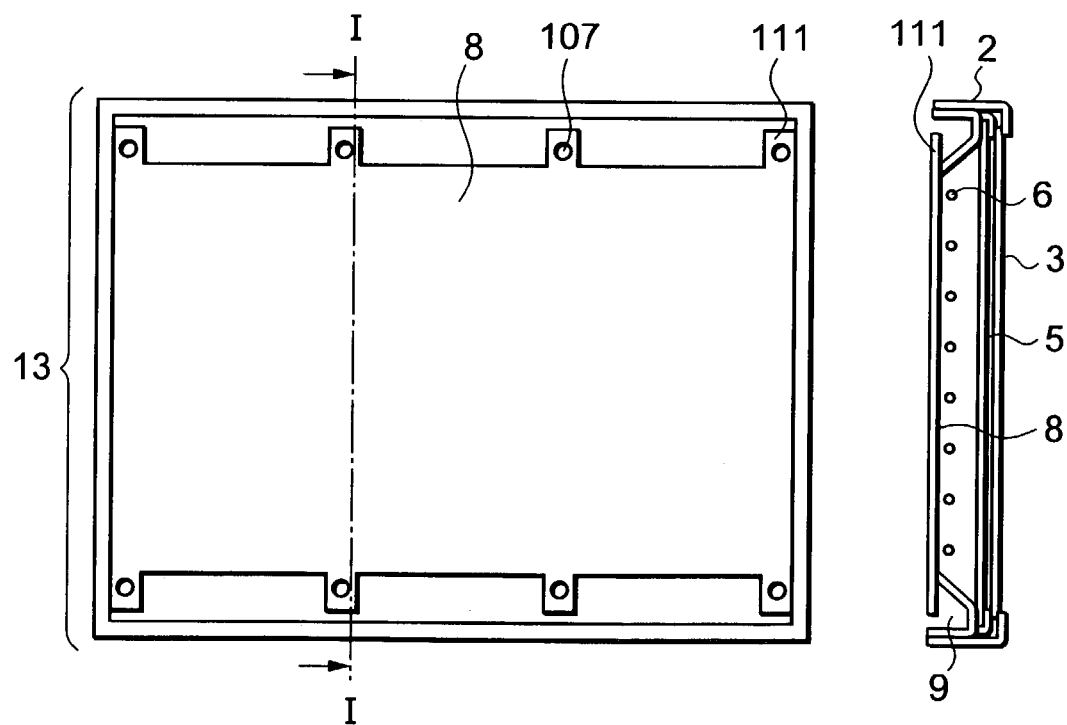
FIG. 5A is a rear side view of the liquid crystal module shown in FIG. 3B.
FIG. 5B is a cross sectional view taken along line I—I of FIG. 5A.

FIGS. 5A, 5B are a rear side view of the liquid crystal module 13 shown in FIG. 3 and a cross sectional view taken along line I—I of FIG. 5A. A reflector extension 111 constituting a part of the reflector 8 and extending from the main body of the reflector 8 is provided so as to extend toward the space 9 near the reflector slope, constituting a plurality of receiving portions. The reflector extension 111 has a screw hole 107 formed therein and adapted to attach together the liquid crystal module 13 and the monitor member 12. The reflector extension 111 constitutes a specific number of reflector extensions 111 and the specific number of reflector extensions are provided to reinforce the attachment between the monitor member 12 and the reflector 8 and to occupy sufficient area in order to prevent deformation of a boundary between the monitor member 12 and the reflector 8 even after completion of the attachment therebetween.

Figure 6:
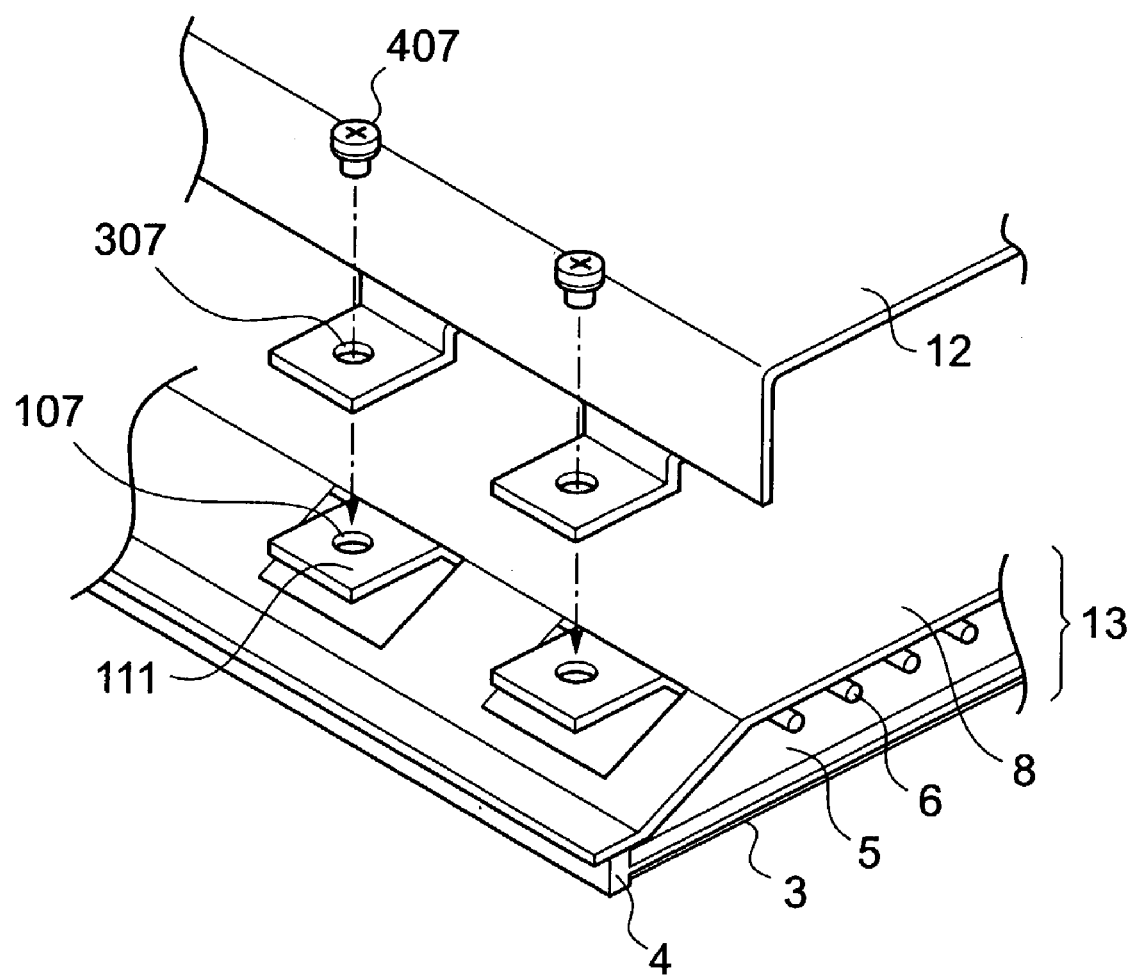
FIG. 6 is an enlarged perspective view illustrating a situation in which a liquid crystal module and a monitor member are attached together in accordance with the first embodiment of the invention.

FIG. 6 is an enlarged perspective view illustrating how the monitor member 12 is attached to the reflector extensions 111 provided as a receiving portion in the liquid crystal module 13 shown in FIGS. 3, 5A, 5B. As shown in FIG. 6, the monitor member 12 has attachment portions therein in which screw holes 307 are formed and the screw holes 307 are aligned with the screw holes 107 in the reflector extensions 111 provided in the liquid crystal module 13, and the liquid crystal module 13 and the monitor member 12 are fixed to each other by screws 407 via those screw holes. Then, the compartment frames 101, 201 are made to cover the outer periphery of the assembly formed by the aforementioned components, thereby providing the entire liquid crystal monitor.

As described above, the liquid crystal monitor of the embodiment is configured to have the receiving portions, in the liquid crystal module 13, adapted to attach to the attachment portions of the monitor member 12 and provided as the reflector extensions 111 that constitute a part of the reflector 8, and further, extending from the main body of the reflector 8 toward the space 9 between the reflecting slope 110 and the upper frame 2 of the liquid crystal module 13. Furthermore, the liquid crystal monitor is configured to attach the monitor member 12 to the liquid crystal module 13 with screws 407 via the screw holes 107 formed in the reflector extensions 111.

In the liquid crystal monitor shown in FIG. 2 and assembled using the conventional rear attachment method for attachment between a liquid crystal module and a monitor member, the attachment screw 407 needs to have its distal end positioned so as to avoid contact with the optical members such as a reflector and preventing adverse effect on brightness of the monitor. Furthermore, the protrusion 211 needs to be provided in the lower reflecting face 310 of the reflector and at a location outside the reflector, and then, a screw hole 107 needs to be provided in the protrusion 211 to fix the monitor member 12 through the screw hole 107 using a screw 407 to the reflector 8. This unfavorably increases the thickness of the liquid crystal monitor. In contrast, the liquid crystal monitor of the first embodiment of the invention is configured to have the reflector extensions 111 provided in the space 9 near the reflector slope and attach together the liquid crystal module 13 and the monitor member 12 via the reflector extensions 111. Accordingly, physical contact between the screw 407 and the optical members such as a reflector 8 can be avoided, allowing the liquid crystal monitor to be thinned and reduced in size.

Figure 7:
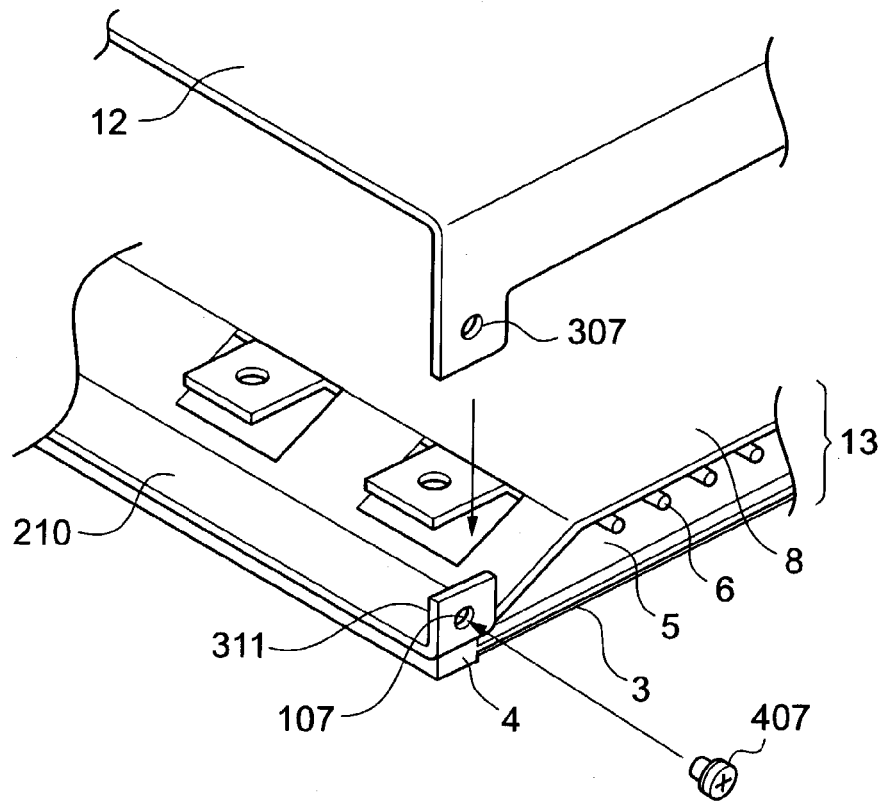
FIG. 7 is an enlarged perspective view illustrating a situation in which a liquid crystal module and a monitor member are attached together in accordance with a second embodiment of the invention.
Figure 8:
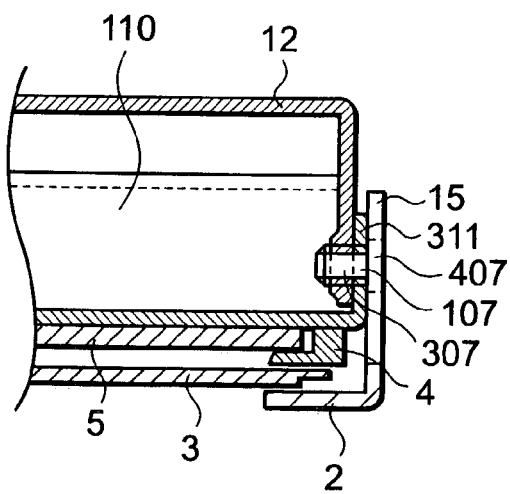
FIG. 8 is a partial sectional view of the liquid crystal monitor assembled in accordance with the second embodiment of the invention.

A second embodiment of the invention will be explained below. FIG. 7 is an enlarged perspective view illustrating a situation in which a liquid crystal module and a monitor member are attached together in accordance with the second embodiment and FIG. 8 is a partial sectional view illustrating a receiving portion of a liquid crystal monitor and an attachment portion of a monitor member, both portions being adapted to attach together the liquid crystal monitor and the monitor member. As shown in FIGS. 7, 8, the receiving portion of a liquid crystal monitor 13 is adapted to attach to the attachment portion of a monitor member 12 and consists of a reflector bending portion 311 that is formed by bending a part of the reflector 8 within a space 9 near a reflector slope and provided in a plane parallel to the side face of the liquid crystal module 13. Furthermore, the monitor member 12 has a screw hole 307 formed therein and the screw hole 307 is aligned with a screw hole 107 formed in the reflector bending portion 311, and the liquid crystal module 13 and the monitor member 12 are fixed to each other by a screw 407 via the screw hole 107.

In this case, as shown in FIG. 8, if the attachment portion having the screw hole 307 and formed in the monitor member 12 is provided at a location positioned nearer the inside of the liquid crystal module than the reflector bending portion 311, the head (meaning a portion receiving a driver) of the screw 407 never protrudes from the circumference formed by the liquid crystal module 13 and the monitor member 12, allowing a compartment frame 1 adapted to cover the liquid crystal module 13 and the monitor member 12 to be reduced in size.

In the liquid crystal monitor shown in FIG. 1 and assembled using the conventional side attachment method for attachment between a liquid crystal module and a monitor member, the upper frame 2 needs to be enlarged in size toward the outside of the liquid crystal module 13 in order to prevent contact between the distal end of the screw 407 and the optical members such as a support 14 for a fluorescent tube 6. However, employment of the liquid crystal monitor of the embodiment eliminates such need for enlargement of the upper frame, allowing reduction in the width of frame of liquid crystal monitor and the size of liquid crystal monitor. As is already described, in the conventional side attachment method, if the receiving portion of reflector, adapted to attach to the attachment portion of the monitor member 12, is displaced from the position, shown in FIG. 1, in a direction of the thickness of the liquid crystal module to avoid contact between the optical members and the attachment screw 407, the liquid crystal module 13 unfavorably increases its thickness. However, employment of the liquid crystal monitor, shown in FIGS. 7, 8, of the second embodiment of the invention solves the aforementioned problem found in the liquid crystal monitor assembled using the conventional side attachment method.

Figure 11:
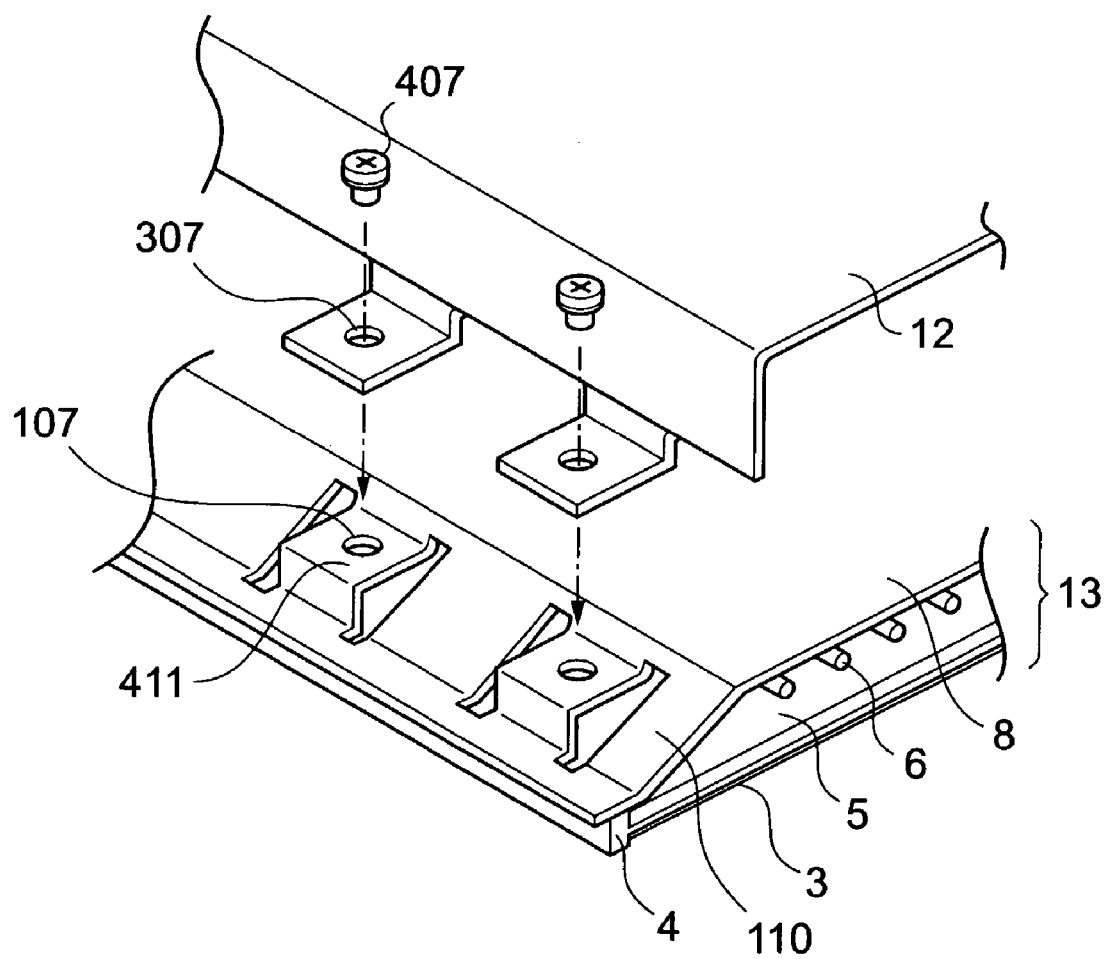
FIG. 11 is an enlarged perspective view illustrating a situation in which a liquid crystal module and a monitor member are attached together in accordance with the third embodiment of the invention.

A third embodiment of the invention will be explained below. FIG. 9 is a partial cross sectional view of a liquid crystal monitor of the third embodiment of the invention. FIGS. 10A, 10B are rear side views of the liquid crystal module 13 shown in FIG. 9 and a cross sectional view taken along line II—II of FIG. 10A. FIG. 11 is an enlarged perspective view illustrating how a liquid crystal module 13 having a specific number of reflector protrusions 411 provided therein and shown in FIGS. 10A, 10B, and a monitor member 12 are attached together. As a liquid crystal monitor has recently been becoming thinner and lighter, a reflector 8 constituting a liquid crystal module has been strongly required to be thinner and lighter. Therefore, in order to prevent deformation of individual sets of receiving portion and attachment portion upon completion of attachment between the liquid crystal module 13 and the monitor member 12, the individual sets of receiving portion and attachment portion adapted for attachment between the liquid crystal module 13 and the monitor member 12 have to be reinforced to a larger degree.

Accordingly, as shown in FIGS. 9 through 11, the liquid crystal monitor of the embodiment has a plurality of reflector protrusions 411 therein adapted as a receiving portion to attach to the attachment portions of the monitor member 12 and configured to cause a part, i. e., at least two fractional faces, of the reflector 8 of the liquid crystal module 13 to protrude toward a space 9 near a reflector slope. Screw holes 107 are provided in the plurality of reflector protrusions 411 of the liquid crystal module 13 to attach together the liquid crystal module 13 and the monitor member 12. The screw holes 307 of the attachment portions of the monitor member 12 are aligned with the screw holes 107 and then, the liquid crystal module 13 and the monitor member 12 are attached together by screws 407 via those screw holes. Thus, the liquid crystal module 13 and the monitor member 12 are solidly attached together at locations of the reflector protrusions 411 and even in a case where the reflector 8 becomes thin and/or light or the monitor member 12 becomes heavy, causing difficulty in ensuring reinforcement of the sets of receiving portion and attachment portion, the aforementioned attachment between the liquid crystal module 13 and the monitor member 12 through the reflector protrusions 411 can prevent various failures due to deformation of the sets of receiving portion and attachment portion.

Furthermore, in the liquid crystal monitor shown in FIG. 2 and assembled using the conventional rear attachment method for attachment between a liquid crystal module and a monitor member, the protrusion 211 needs to be provided in the lower reflecting face 310 of the reflector and at a location protruding toward the outside of the liquid crystal module to make the distal end of the screw 407 positioned so as to avoid contact with the optical members of the backlight and then the screw holes 107, 307 are provided respectively in the protrusion 211 and the monitor member 12. However, employment of the liquid crystal monitor of the embodiment eliminates such need for formation of the protrusion, allowing the liquid crystal monitor to be thinned and reduced in size.

Figure 12:
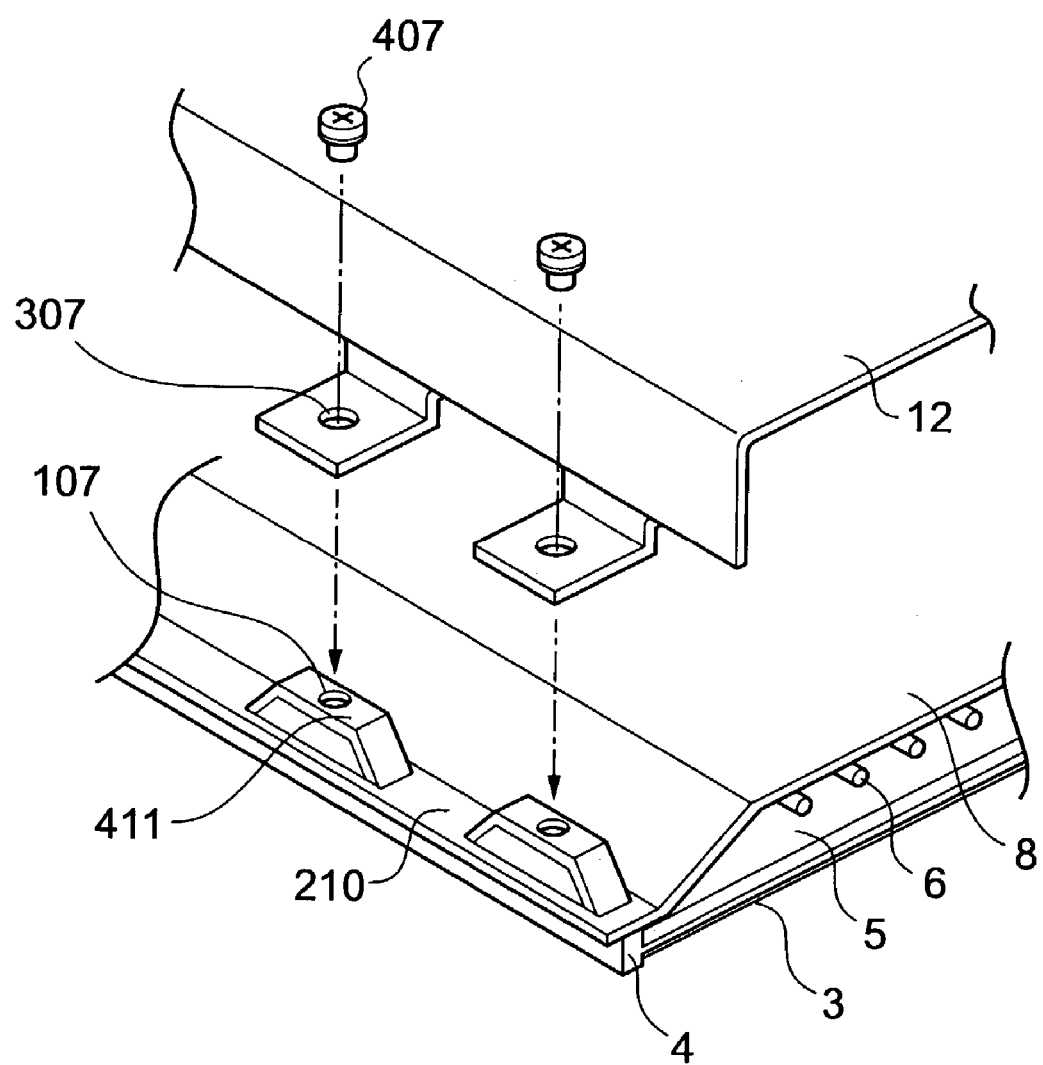
FIG. 12 is an enlarged perspective view of a modification of the attachment structure shown in FIG. 11.

FIG. 12 is a perspective view of a modification of the aforementioned third embodiment. In the modification, a part of an upper reflecting face 210 of the reflector is pressed from the side of the liquid crystal panel 3 toward the space 9 near the reflector slope to form reflector protrusions 411 (hereinafter, the operation is referred to as press working.) The reflector protrusions 411 serve as a receiving portion adapted to attach to the attachment portion of the monitor member 12. The reflector protrusions 411 formed through the press working each have a screw hole 107 provided therein to attach together the liquid crystal module 13 and the monitor member 12 with screws 407. When employing the configuration shown in FIG. 12, the reflector protrusions 411 can easily be formed in the space 9 near the reflector slope through the press working and further, the liquid crystal module 13 and the monitor member 12 can solidly be attached together via the reflector protrusions 411.

Figure 13:
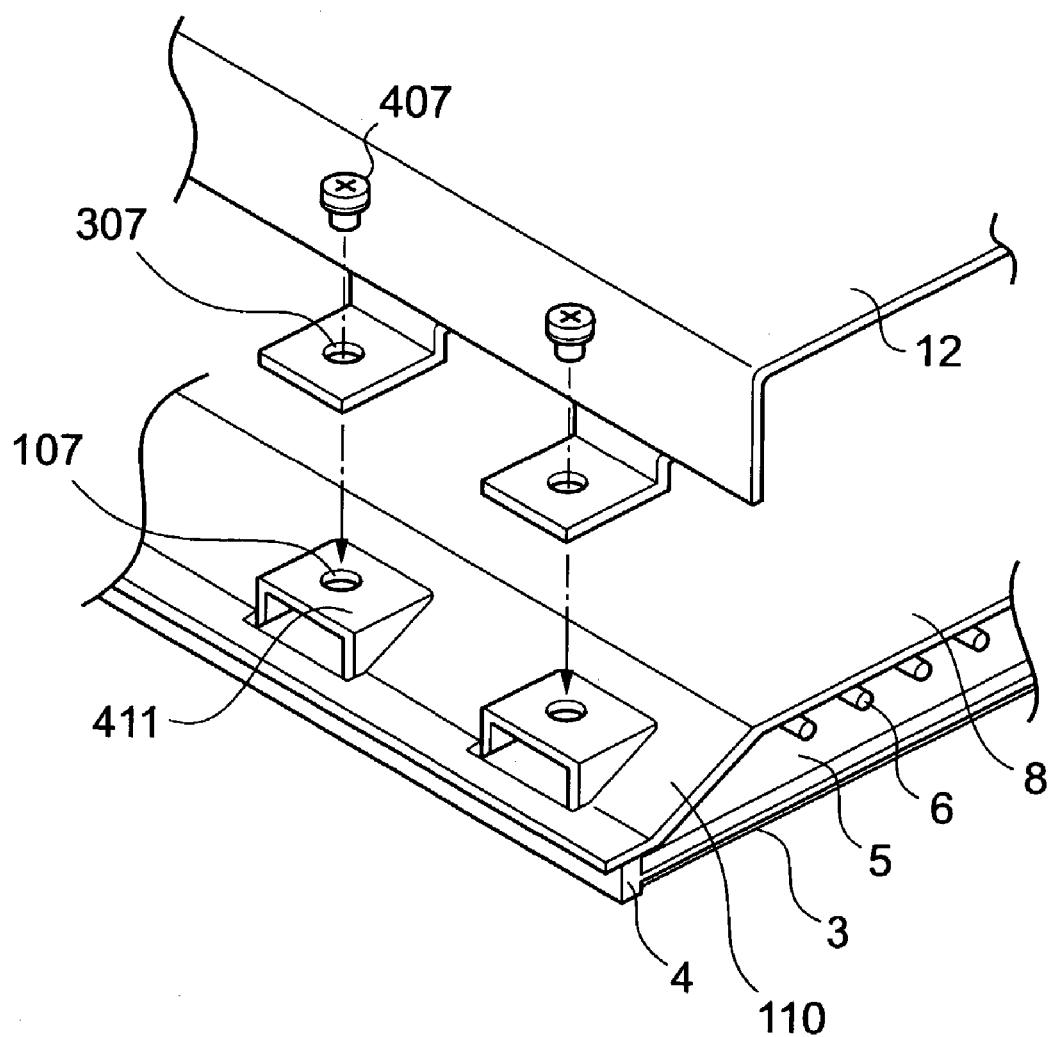
FIG. 13 is an enlarged perspective view of another modification of the attachment structure shown in FIG. 11.

FIG. 13 is a perspective view of another modification of the aforementioned third embodiment. In the modification, as shown in FIG. 13, a part of the reflector slope 110 of the reflector is pressed from the side of the liquid crystal panel 3 toward the space 9 to form reflector protrusions 411 and the reflector protrusions 411 formed through the press working each are processed to have a screw hole 107 provided therein to attach together the liquid crystal module 13 and the monitor member 12 with screws 407. Employment of the third embodiment of the invention shown in FIGS. 9 through 13 makes it possible to solve drawbacks, i. e., increase in the thickness and the scale of liquid crystal monitor, found in the liquid crystal monitor assembled using the conventional rear attachment method, and further, permits the liquid crystal module 13 and the monitor member 12 to more solidly be attached together.

Figure 14:
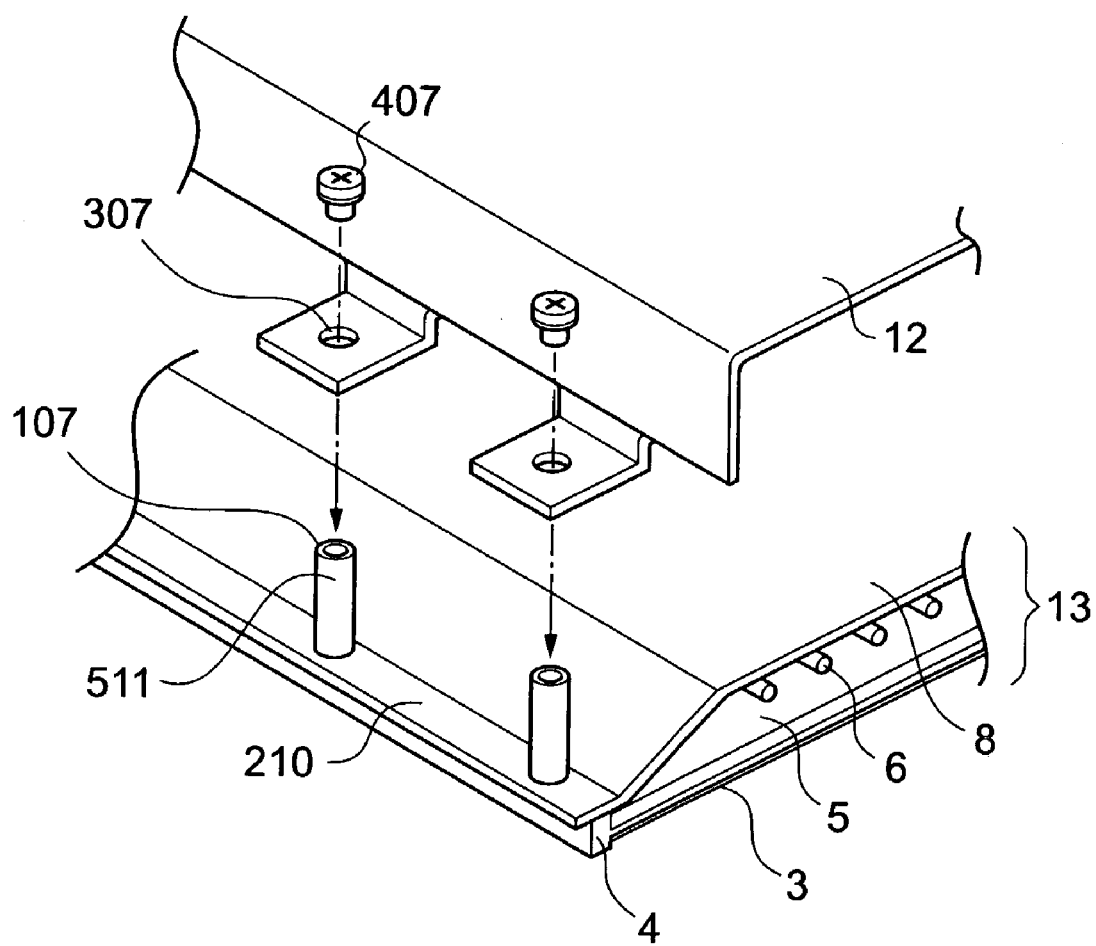
FIG. 14 is an enlarged perspective view illustrating an attachment structure for attaching together a liquid crystal module and a monitor member in accordance with a fourth embodiment of the invention.

A fourth embodiment of the invention will be explained below. FIG. 14 is an enlarged perspective view illustrating a situation in which a liquid crystal module and a monitor member are attached together in accordance with the fourth embodiment. As shown in FIG. 14, the liquid crystal monitor of the embodiment is configured to have reflector protrusions 511 formed in the shape of cylindrical stud and positioned in a space 9 near a reflector slope in order to ensure the strength of the sets of receiving portion and the attachment portion. Note that the reflector protrusions 511 are formed in a manner different from that employed to form the reflector protrusions 411 of the third embodiment and are formed as a component independent of the reflector 8. That is, the reflector protrusions 511 are solidly joined and fixed to an upper reflecting face 210 of the reflector 8 in the space 9 near the reflector slope. The reflector protrusions 511 formed as a component independent of the reflector 8 provide an effective approach to the case in which the reflector 8 formed thin cannot ensure the strength of the sets of receiving portion and the attachment portion and therefore, it is difficult to form the sets of receiving portion and the attachment portion adapted to attach together the liquid crystal module 13 and the monitor member 12 by processing a part of the reflector 8 in accordance with the first to third embodiments of the invention. Employment of the fourth embodiment of the invention shown in FIG. 14 makes it possible to solve drawbacks, i. e., increase in the thickness and the scale of liquid crystal monitor, found in the liquid crystal monitor assembled using the conventional rear attachment method, and further, permits the liquid crystal module 13 and the monitor member 12 to more solidly be attached together.

Figure 15:
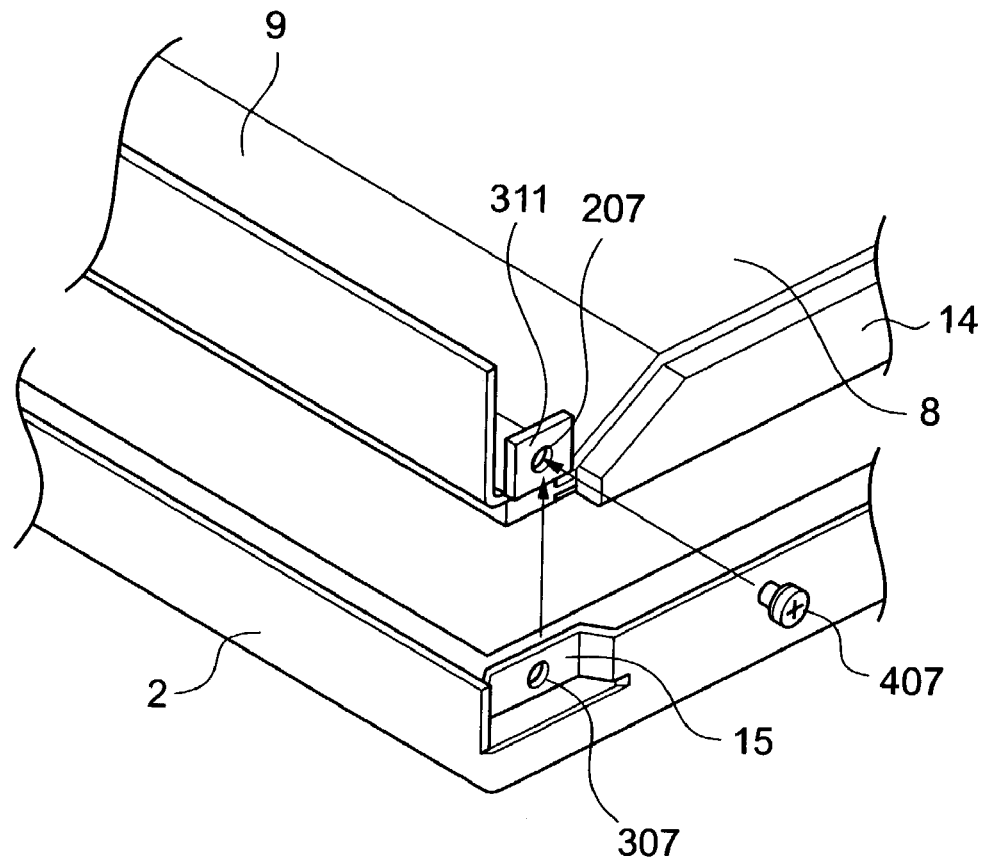
FIG. 15 is a partial cross sectional view of a liquid crystal module assembled in accordance with a fifth embodiment of the invention.

A fifth embodiment of the invention will be explained below. FIG. 15 is an enlarged perspective view illustrating a situation in which a liquid crystal module is assembled in accordance with the fifth embodiment of the invention. As shown in FIG. 15, the liquid crystal module is configured to have a reflector bending portion 311 provided in a space 9 near a reflector slope of a reflector 8 that constitutes a direct backlight and the reflector bending portion 311 has a screw hole 207 provided therein to attach together an upper frame 2 and the direct backlight. Furthermore, the upper frame 2 has an upper frame protrusion 15, in which a screw hole 307 is formed, and the screw hole 307 of the upper frame 2 is aligned with the screw hole 207 to attach together the upper frame and the direct backlight with a screw 407.

Figure 16:
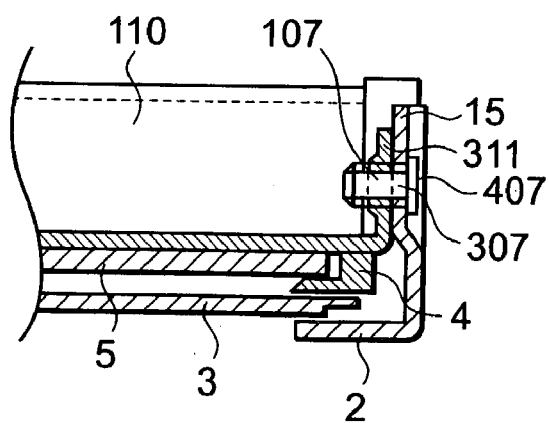
FIG. 16 is a partial sectional view of the liquid crystal module shown in FIG. 15.

The followings can be seen from the partial cross sectional view, shown in FIG. 16, of a set of receiving portion and attachment portion adapted for attachment between the upper frame 2 and the direct backlight. That is, the reflector bending portion 311 is formed at a location positioned inside the circumference of the direct backlight in the space 9 near the reflector and a part of the upper frame 2 is formed to have the protrusion 15 positioned inside the liquid crystal module 13, and the upper frame protrusion 15 is formed to have the screw hole 307 through which the upper frame 2 and the direct backlight are attached together. The liquid crystal module assembled in the aforementioned manner is able to make the head of the screw 407 positioned so as not to protrude from the circumference of the liquid crystal module 13 and reduce the size of the circumference thereof, allowing reduction in the size of liquid crystal monitor and the width of the frame of liquid crystal monitor.

Figure 17:
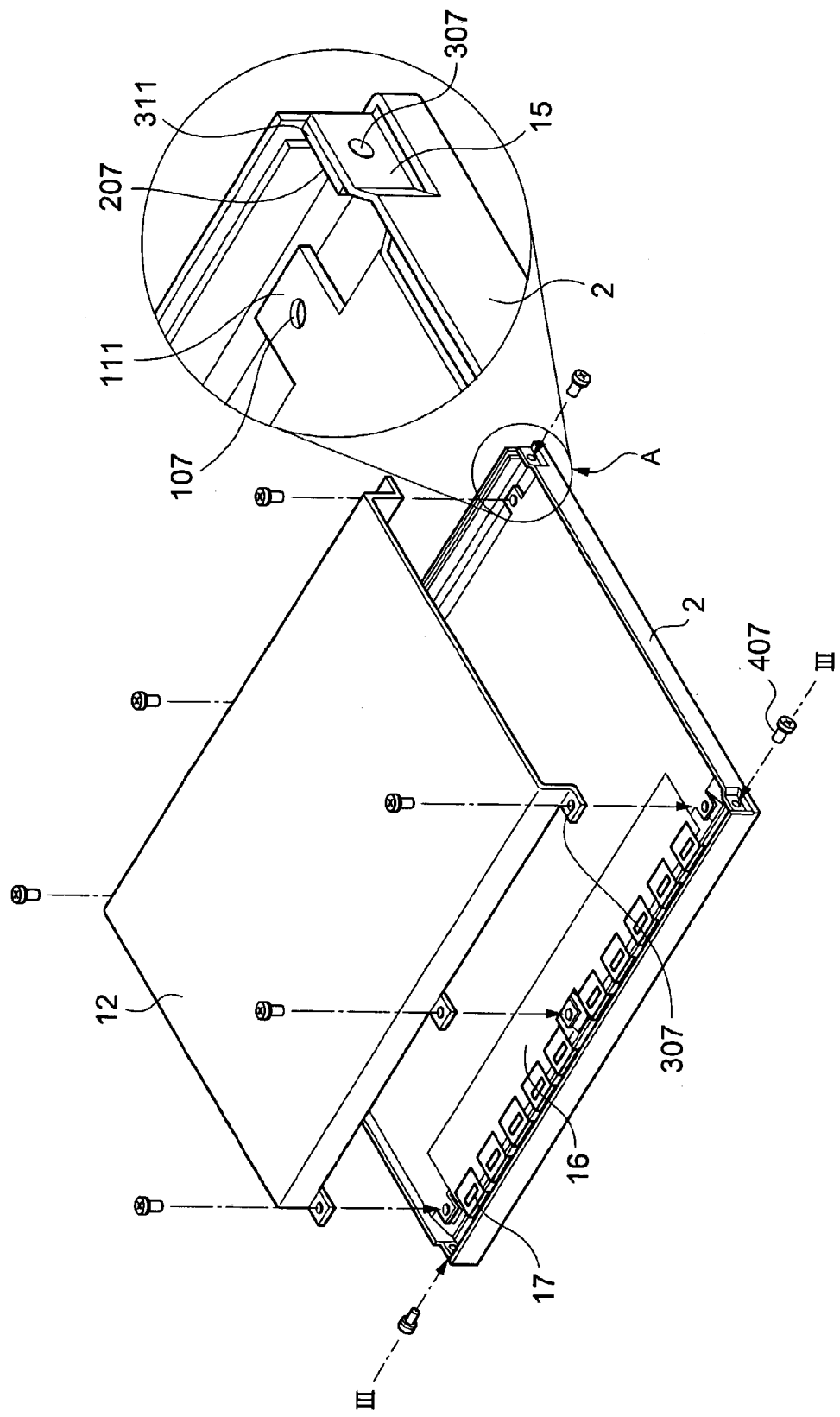
FIG. 17 is an exploded perspective view illustrating a situation in which a liquid crystal module and a monitor member are attached together in accordance with a sixth embodiment of the invention.
Figure 18:
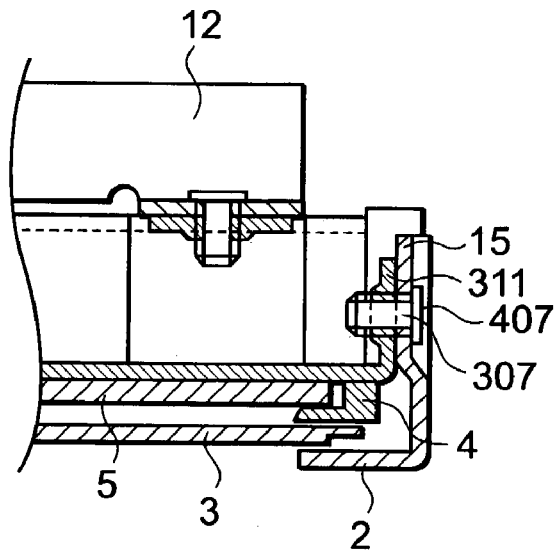
FIG. 18 is a cross sectional view taken along line III—III of FIG. 17.

A sixth embodiment of the invention will be explained below. FIG. 17 is an exploded perspective view illustrating a situation in which a liquid crystal monitor is assembled in accordance with the sixth embodiment of the invention. The liquid crystal module shown in FIG. 17 is conceived as a combination of configurations described in the fifth and first embodiments to allow the liquid crystal monitor to narrow its frame and thin itself, and further reduce its volume. The liquid crystal monitor of the embodiment is constructed such that a liquid crystal module 13 includes provided therein both the reflector bending portion 311 as described in the fifth embodiment, shown in FIGS. 15, 16, of the invention and the reflector extension 111 as described in the first embodiment, shown in FIGS. 3, 5, 6, of the invention, and then, a monitor member 12 is attached to the liquid crystal module 13. FIG. 18 is a cross sectional view illustrating a situation in which the liquid crystal module 13 and the monitor member 12, both shown in FIG. 17, are attached together, and which is a cross-sectional view taken along line III—III shown in FIG. 17.

The liquid crystal module 13 is assembled such that the screw holes 207 formed in the reflector bending portions 311 shown in FIGS. 15, 16 and the screw holes 307 formed in an upper frame 2 are aligned with each other, and then, a direct backlight and the upper frame 2 are solidly attached together by screws 407 via those screw holes. The liquid crystal module 13 is configured to have the reflector 8 that includes formed therein the reflector extensions 111 explained in the description of the first embodiment of the invention and the reflector extensions 111 each have a screw hole 107 formed therein. The screw holes 307 of the reflector extensions 111 of the liquid crystal module 13 are aligned with the screw holes 107 of attachment portions of the monitor member 12 and the liquid crystal module 13 and the monitor member 12 are fixed to each other by screws. Thus, employment of the configuration shown in FIGS. 17, 18 allows the upper frame 2 and the direct backlight to be attached together via the screw holes 307 formed in upper frame protrusions 15, thereby permitting the screw 407 to position its head at a location that never protrudes from the circumference of the liquid crystal module 13. In the liquid crystal monitor shown in FIG. 1 and assembled using the conventional side attachment method for attachment between a liquid crystal module and a monitor member, the upper frame 2 needs to be enlarged in size toward the outside of the liquid crystal module 13 in order to prevent contact between the distal end of the screw 407 and the optical members such as the support 14 for a fluorescent tube 6. However, employment of the liquid crystal monitor of the embodiment eliminates the need to enlarge the circumference of the upper frame toward the outside of the liquid crystal module 13, allowing the liquid crystal module 13 to reduce the size of the circumference of the module and further permitting the liquid crystal monitor to reduce its size and the width of the monitor frame.

Furthermore, in the liquid crystal monitor shown in FIG. 2 and assembled using the conventional rear attachment method for attachment between a liquid crystal module and a monitor member, the reflector protrusion 211 needs to be provided in the lower reflecting face 310 of the reflector and at a location protruding toward the outside of the liquid crystal module to make the distal end of the screw 407 positioned so as to avoid contact with the optical members of the backlight, and then, the screw holes 107, 307 are provided respectively in the reflector protrusion 211 and the monitor member 12. Contrary to the configuration shown in FIG. 2 and similarly to the first embodiment, the liquid crystal monitor of the sixth embodiment of the invention is configured to have the reflector extension 111 provided in the space 9 near the reflector slope and attach together the liquid crystal module 13 and the monitor member 12 via the reflector extension 111. This allows the liquid crystal monitor of the embodiment to exclude the need for formation of the reflector protrusion 211, enabling the liquid crystal monitor to thin itself and reduce its size.

Furthermore, the liquid crystal monitor shown in FIG. 17 is conceived as a combination of configurations described in the fifth and first embodiments to allow the liquid crystal monitor to narrow its frame and thin itself, and further reduce its volume. Moreover, since the liquid crystal monitor of the embodiment is configured to avoid contact between a component, such as an inverter and a circuit board 16 for driving liquid crystal, disposed on a rear face or a side face of the liquid crystal module 13 and the sets of receiving portion and attachment portion adapted to attach together the liquid crystal module 13 and the monitor member 12, a liquid crystal monitor can advantageously be configured with a higher freedom of design. Note that numeral 17 denotes a flat cable used to connect a liquid crystal panel 3 to the circuit board 16 for driving liquid crystal. Additionally, when replacing the reflector extension 111 shown in FIG. 17 with the reflector protrusions 411, 511 described in the third and fourth embodiments of the invention or adding the reflector protrusions 411, 511 to the reflector extension 111 in order to utilize those the reflector protrusions together with the reflector extension 111, the liquid crystal module 13 and the monitor member 12 can more solidly be attached together. Therefore, even in a case where the reflector 8 is fabricated thin and/or light or the monitor member 12 is fabricated heavy, various failures due to deformation of the sets of receiving portion and attachment portion can be prevented.

Figure 19:
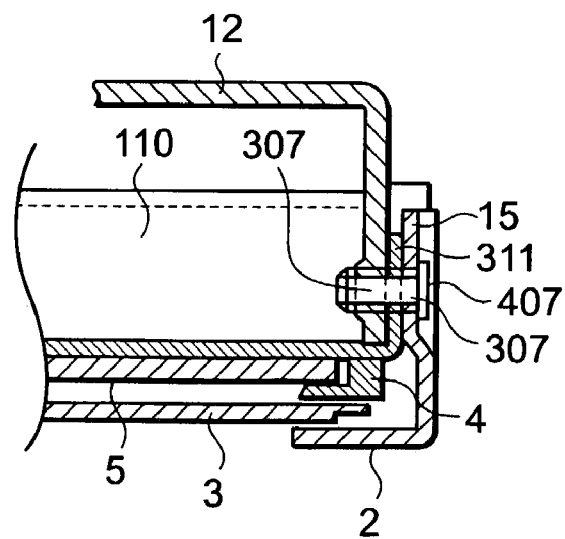
FIG. 19 is an partial perspective view illustrating a situation in which a liquid crystal module and a monitor member are attached together in accordance with a seventh embodiment of the invention.

A seventh embodiment of the invention will be explained below. FIG. 19 is a partial sectional view illustrating a liquid crystal monitor of the seventh embodiment of the invention. As shown in FIG. 19, the liquid crystal monitor is constructed such that a junction joining the reflector bending portion 311 of the direct backlight and the upper frame protrusion 15, and the attachment portion provided in the monitor member 12 and including therein the screw hole 307 described in the second embodiment of the invention, are integrally attached together by a screw 407 at a location positioned inside the circumference of the liquid crystal module 13 and farther apart from the circumference of the module than the reflector bending portion 311 in a space 9 near a reflector slope. As described above, the liquid crystal monitor of the embodiment is configured to integrally fix the upper frame, the liquid crystal module and the monitor member to one another and therefore, employment of the liquid crystal monitor of the embodiment reduces the total number of screws to be used for assembly of liquid crystal monitor, allowing the liquid crystal monitor to be easily assembled and permitting the reflector 8 to easily be processed.

An eighth embodiment of the invention will be explained below. The eighth embodiment is applied to a liquid crystal monitor having the following configurations. That is, the liquid crystal monitor is configured such that components, such as an inverter and a circuit board for driving liquid crystal, is arranged on a rear face or a side face of the liquid crystal module 13 and the arrangement of the components causes difficulty in forming in the reflector 8 a necessary number of receiving portions adapted to attach to the attachment portions of the monitor member 12, as is shown in the liquid crystal monitor of each of the embodiments 1 through 4. Alternatively, the liquid crystal monitor is configured to have the monitor member 12 fabricated heavy, requiring further reinforced attachment portions, and therefore, form the attachment portions, adapted to give joints with the monitor member 12, in the upper frame 2 positioned at the side face of the liquid crystal module 13, in addition to the reflector extensions 111, reflector bending portions 311, the reflector protrusions 411 or the reflector protrusions 511.

Figure 20:
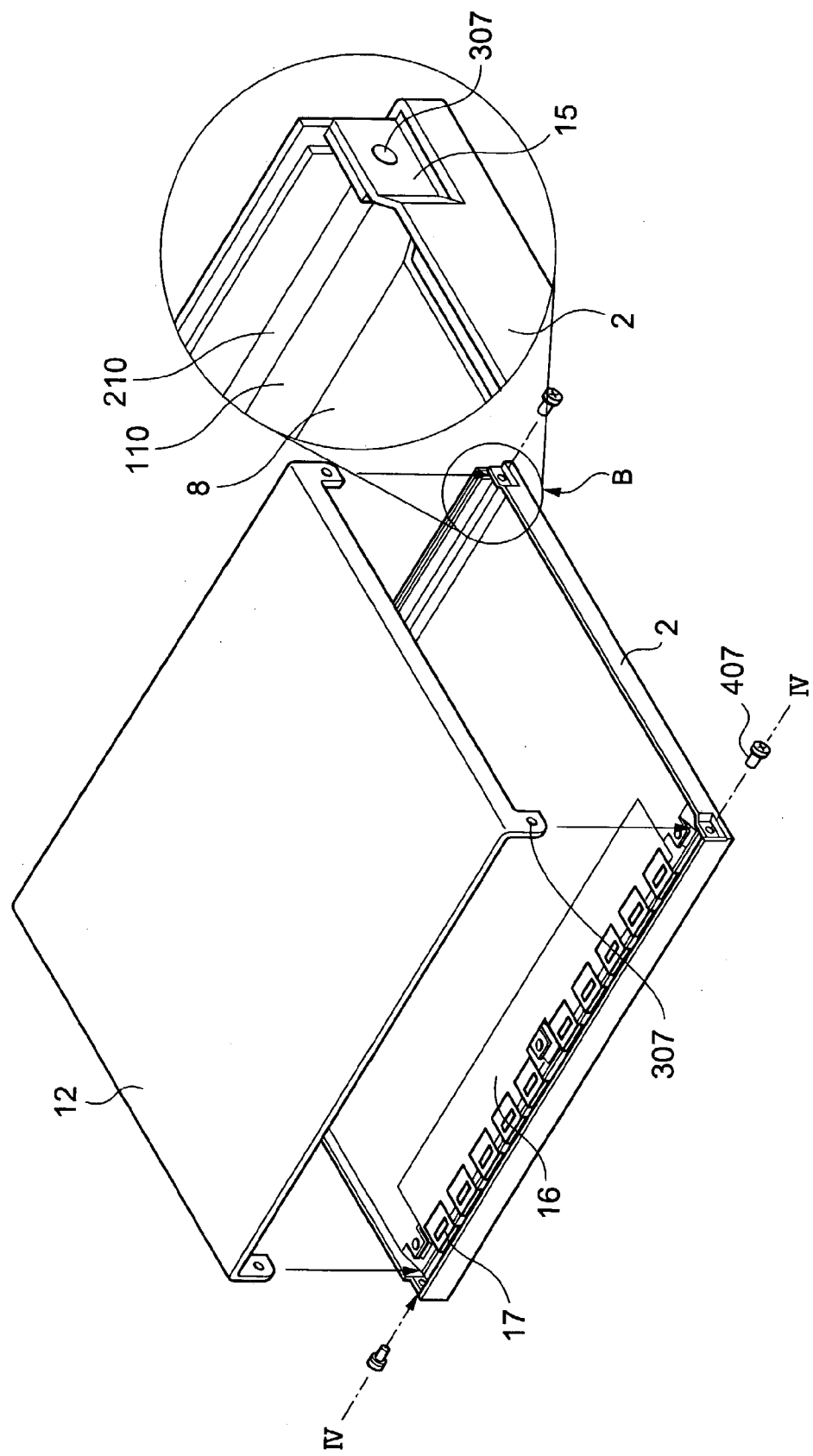
FIG. 20 is an exploded perspective view illustrating a situation in which a liquid crystal module and a monitor member are attached together in accordance with an eighth embodiment of the invention.

FIG. 20 is an exploded perspective view illustrating a situation in which the liquid crystal module 13 and the monitor member 12 are attached together in accordance with the eighth embodiment of the invention. As shown in FIG. 20, the upper frame 2 is configured to have an upper frame protrusion 15 adapted as a receiving portion that gives a joint with the monitor member 12 and formed in the side face of the upper frame of the liquid crystal module 13, and further, positioned in a space 9 near the reflector 8. Furthermore, the upper frame protrusion 15 has a screw hole 307 formed therein and the monitor member 12 has a screw hole 207 formed in a part of the member 12 and aligned with the screw hole 307 of the upper frame protrusion 15, and the liquid crystal module 13 and the monitor member 12 are joined together via those screw holes by a screw 407.

Figure 21:
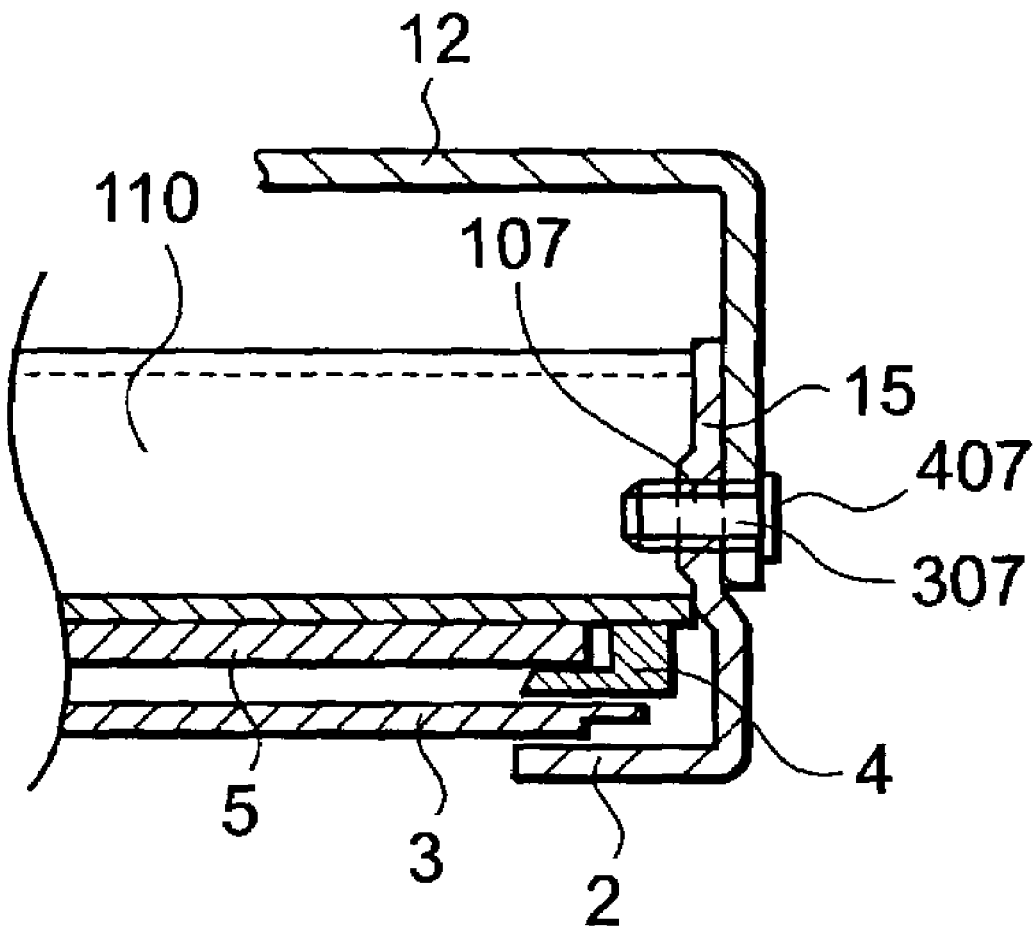
FIG. 21 is a cross sectional view taken along line IV—IV of FIG. 20.

FIG. 21 is a cross sectional view of the liquid crystal monitor having the liquid crystal module 13 and the monitor member 12 joined together and taken along line IV—IV of FIG. 20. In this case, as can be seen from FIG. 21, since the upper frame protrusion 15 and the attachment portion, having the screw hole 207 formed therein, of the monitor member 12 are disposed inside the circumference of the liquid crystal module 13 in the space 9 near a reflector slope, the head of the screw 407 never projects from the circumference of the liquid crystal module 13, allowing the size the circumference of the liquid crystal monitor 13 to be smaller than the circumference of the liquid crystal monitor assembled using the conventional side attachment method and enabling reduction in the width and size of liquid crystal monitor.

As described so far in the first through eighth embodiments of the invention, the joints between the liquid crystal module 13 and the monitor member 12 and between the direct backlight and the upper frame 2 each have a screw hole formed therein, and then, both members, i. e., the module member and the monitor member, are solidly fixed via those screw holes by a screw. Fixing both members to each other using a screw through the joint ensures the strength against vibration and shock and further ensures secure attachment between the receiving portions of module member and the attachment portions of monitor member, easily maintaining electrical connection between both members.

As described so far, the liquid crystal monitor of the invention is configured to have the joint between the liquid crystal module and the monitor member provided in a space formed between the reflector slope of the direct backlight of the liquid crystal module and the upper frame of the liquid crystal module, allowing the liquid crystal monitor to be thinned and reduced in its size and the width of monitor frame.

What is claimed is:

1. A liquid crystal monitor comprising:
   a liquid crystal module including: a direct backlight containing a reflector; a liquid crystal panel; and an upper frame holding said direct backlight and said liquid crystal panel;
   a liquid crystal monitor member; and
   a compartment frame covering an assembly formed by attaching together said liquid crystal module and said liquid crystal monitor member through a receiving portion of said liquid crystal module and an attachment portion of said liquid crystal monitor member,
   wherein, said liquid crystal monitor being further constructed such that said receiving portion of said liquid crystal module is provided so as not to protrude from a circumference defined by primary faces of said direct backlight, said liquid crystal panel and said upper frame,
   wherein said receiving portion of said liquid crystal module is provided in a reflector of said direct backlight and disposed in a space between an inclined face of said reflector and said upper frame of said liquid crystal module, and wherein said receiving portion of said liquid crystal module is formed by extending a part of said reflector in a direction parallel to a primary face of said reflector.

2. The liquid crystal monitor according to claim 1, wherein said receiving portion of said liquid crystal module is formed by extending a part of said reflector from a primary face of said reflector while bending said part of said reflector.

3. The liquid crystal monitor according to claim 1, wherein said receiving portion of said liquid crystal module is formed by protruding a part of said reflector from a primary face of said reflector.

4. The liquid crystal monitor according to claim 1, wherein said receiving portion of said liquid crystal module is formed of a component joined to said reflector.

5. The liquid crystal monitor according to claim 1, wherein said receiving portion of said liquid crystal module and said attachment portion of said liquid crystal monitor support member each have a screw hole formed therein and wherein said liquid crystal module and said liquid crystal monitor support member are joined together via said screw holes by a screw.

6. The liquid crystal monitor according to claim 1, wherein said liquid crystal module is configured to have said receiving portion formed in a side face of said upper frame and wherein said receiving portion formed in said side face of said upper frame is disposed in a space between an inclined face of said direct backlight and said upper frame, and further, has a screw hole formed therein.

7. The liquid crystal monitor according to claim 6, wherein said liquid crystal module is configured to have a screw hole formed therein and wherein said liquid crystal module and said liquid crystal monitor support member are joined together via said screw holes by a screw.

8. The liquid crystal monitor of claim 1, wherein said receiving portion includes at least two faces, in which one of said faces is formed by extending said part of said reflector in a direction parallel to a primary face of said reflector.

9. The liquid crystal monitor of claim 1, wherein said attachment portion and said receiving portion each have a screw hole therein and wherein said liquid crystal module and said liquid crystal monitor member are joined together via said screw holes by a screw.

10. The liquid crystal monitor of claim 1, wherein said liquid crystal module is configured such that a reflector bending portion is formed by bending a part of said reflector within a space near said inclined face of said reflector and provided in a plane parallel to a face of said liquid crystal module.

11. The liquid crystal monitor of claim 10, wherein said reflector bending portion has a screw hole provided therein aligned with another screw hole in said upper frame, and wherein said direct backlight and said upper frame are joined together via said screw holes by a screw.

* * * * *